United States Patent [19]

Mikuni

[11] Patent Number: 5,590,247

[45] Date of Patent: Dec. 31, 1996

[54] CHARACTER STRING OUTPUTTING METHOD AND APPARATUS CAPABLE OF VARYING SIZES OF CHARACTERS

[75] Inventor: Shin Mikuni, Hamura, Japan

[73] Assignee: Casio Computer Co., Ltd., Tokyo, Japan

[21] Appl. No.: 296,357

[22] Filed: Aug. 25, 1994

[30] Foreign Application Priority Data

Aug. 31, 1993 [JP] Japan .................................. 5-237136
Aug. 31, 1993 [JP] Japan .................................. 5-237137

[51] Int. Cl.$^6$ ....................................... G06F 15/00
[52] U.S. Cl. ..................... 395/110; 395/102; 395/167
[58] Field of Search ................................ 395/110, 111, 395/112, 101, 117, 114, 102, 115, 109, 150, 139, 151

[56] References Cited

U.S. PATENT DOCUMENTS

| | | | |
|---|---|---|---|
| 5,097,518 | 3/1992 | Scott et al. | 382/47 |
| 5,113,455 | 5/1992 | Scott | 382/47 |
| 5,241,653 | 8/1993 | Collins et al. | 395/139 |
| 5,299,294 | 3/1994 | McCracken et al. | 395/102 |
| 5,301,267 | 4/1994 | Hassett et al. | 395/150 |
| 5,398,306 | 3/1995 | Karow | 395/110 |
| 5,402,529 | 3/1995 | Aoki | 395/115 |
| 5,409,318 | 4/1995 | Imamiya | 400/76 |
| 5,459,828 | 10/1995 | Zack et al. | 395/151 |
| 5,506,942 | 4/1996 | Mikuni et al. | 395/110 |

*Primary Examiner*—Raymond J. Bayerl
*Assistant Examiner*—Steven P. Sax
*Attorney, Agent, or Firm*—Frishauf, Holtz, Goodman, Langer & Chick

[57] ABSTRACT

In a character string outputting apparatus, a character frame is produced by substituting a numeral sequence indicative of an arranging position of each character contained in a desirable character string for a character string configuration function. In this character frame, the respective characters for constituting the desirable character string are allocated within an arbitrary designated character string configuration region. Thus, the fonts for constituting the desirable character string are arranged within the produced character frame, and also the enlarging rate of the respective characters is variable by moving the origins of the fonts about these characters when these fonts are arranged. This character string outputting apparatus may be utilized as such a character string outputting apparatus capable of outputting a proportional spacing font.

14 Claims, 12 Drawing Sheets

FIG.4A
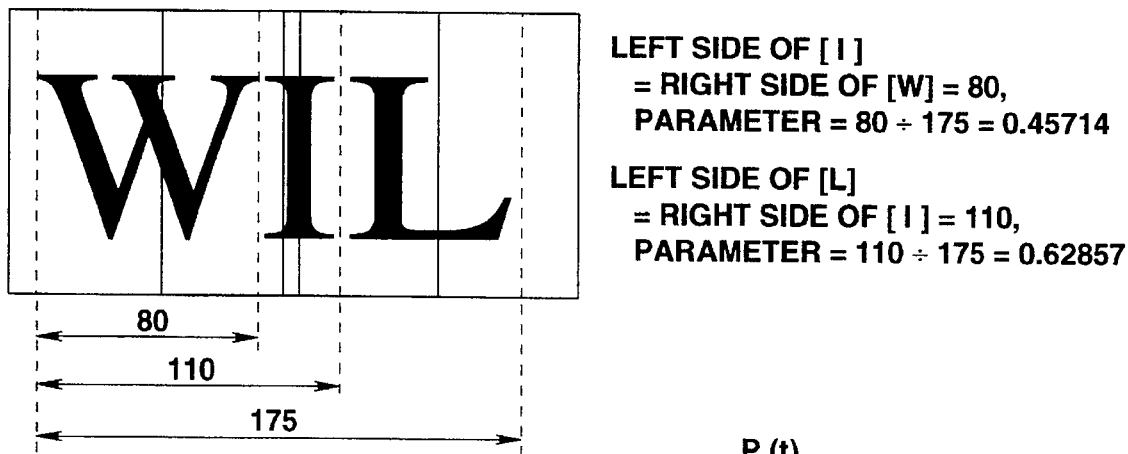
LEFT SIDE OF [ I ]
= RIGHT SIDE OF [W] = 80,
PARAMETER = 80 ÷ 175 = 0.45714
LEFT SIDE OF [L]
= RIGHT SIDE OF [ I ] = 110,
PARAMETER = 110 ÷ 175 = 0.62857
FIG.4B
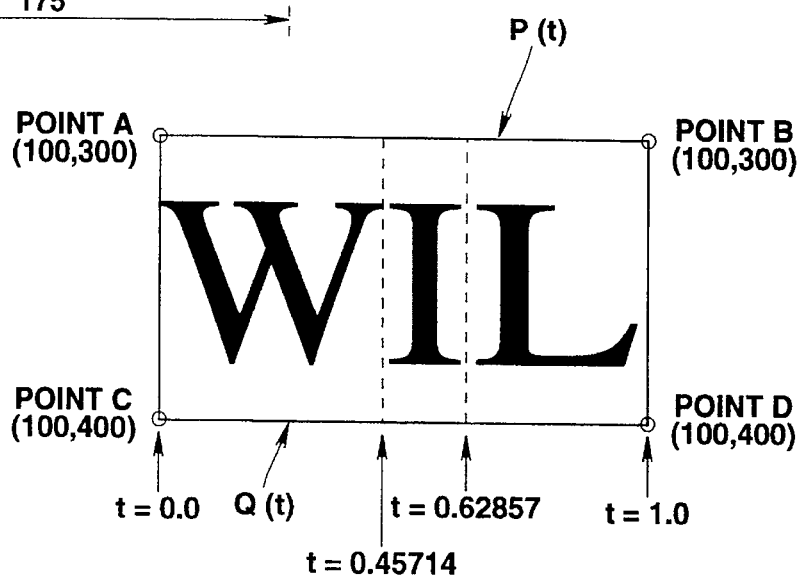
FIG.4C
CONFIGURATION FUNCTION 1
= STRAIGHT LINE TO CONNECT POINT A
AND POINT B
$$\vec{P}(t) = (\vec{B} - \vec{A}) * t + \vec{A}$$
CONFIGURATION FUNCTION 2
= STRAIGHT LINE TO CONNECT POINT C
AND POINT D
$$\vec{Q}(t) = (\vec{D} - \vec{C}) * t + \vec{C}$$
X-COORDINATE OF LEFT END OF [ I ]
= (500-100) * 0.45714 + 100 = 283
X-COORDINATE OF LEFT END OF [L]
= (500-100) * 0.62857 + 100 = 351

ALLOCATION BY USING FONT BODY SIZE

FONT BODY SIZE
  A : 82  B : 85  C : 91  D : 99  E : 74
  F : 63  G : 93  H : 99  I : 44  J : 50

$$\vec{Q}(t) = (\vec{Q}_{10} - \vec{Q}_0)t + \vec{Q}_0$$
$$\vec{P}(t) = (\vec{P}_{10} - \vec{P}_0)t + \vec{P}_0$$

[W]
a = 10
b = 80

[ I ]
a = 35
b = 30

[L]
a = 15
b = 65

POSITION OF [ I ]
= RIGHT END OF [W] - SUPERPOSITION OF [ I ]
= 80 - 35 = 45

POSITION OF [L]
= RIGHT END OF [ I ] - SUPERPOSITION OF [L]
= 80 + 30 - 15 = 95

CHARACTER STRING OUTPUTTING METHOD AND APPARATUS CAPABLE OF VARYING SIZES OF CHARACTERS

BACKGROUND OF THE INVENTION

1. Field of the Invention

The present invention relates to a character string outputting method and an apparatus capable of arranging a desirable character string within an arbitrary designated character string configuration region, which is used in a word processor, a personal computer and the like.

2. Description of the Prior Art

In the conventional character string outputting apparatuses such as word processors and personal computers, when a portion of a text to be outputted is emphasized, there are typically two character emphasizing methods. That is, in one character emphasizing method, a desirable character string of the text is emphasized by using predetermined manners such as meshing, reversing, underlining, inclining, and rotating processes. In the other character emphasing method, the desirable character string is arranged along a preselected line segment, so that this character string is arranged in the form of an arc shape, or a waving shape.

However, in accordance with the these conventional character string emphasizing methods, there are several problems that the character string could be outputted only by such preselected outputting forms, and therefore a degree of freedom in emphasizing of character strings is very low and various demands by users could not be acceptable with respect to the emphasizing manner.

For instance, to emphasize an arbitrary character string, when the magnifications of the respective characters for constituting this character string are continuously changed, and then the dimensions or heights of these characters from the top position until the end position are gradually reduced, it would be possible to output such a character string which extends back a long way. This may achieve very significant effects to emphasize this character string.

In the conventional method to achieve such significant emphasizing effects, the magnifications of the respective characters must be set one by one as to both the vertical direction and the horizontal direction. This magnification setting manner would cause very cumbersome workloads to users. In other words, every user could hardly express such a character string which extends back a long way with having a natural smoothing balance.

To overcome the above-described conventional problem about the character emphasizing method, the Assignee of the present Patent Application has filed one solution method as U.S. patent application Ser. No. 113,835 (filed on Aug. 30, 1993). In this solution method, the character frame used to allocate the respective characters contained in the desirable character string into an arbitrary designated character string configuration region, is determined by substituting the parameters for the character string configuration function. Thus, these characters may be arranged within this predetermined character frame.

Now, a very basic idea of the above-described character string outputting apparatus similarly assigned to this Assignee will be briefly explained with reference to FIG. 8. In FIG. 8, there is schematically shown such a case that 10 characters of "A" to "J" are employed as a desirable character string to be outputted, and two straight lines are entered so as to specify each of the character string arranging regions. In this case, the character string arranging region is specified by such an area which is sandwiched by a straight line P(t) for connecting P(0) to P(10) and a straight line Q(t) for connecting Q(0) to Q(10). These P(t) and Q(t) are called a "character string configuration function". Then, the character frames are determined which are used to specify the arranging region for each of the characters by substituting the suitable parameters for these character string configuration functions P(t) and Q(t).

That is, as to the two straight lines, assuming now that the points on these straight lines are expressed by using the proper parameters, the parameter about the starting edge of the straight line is set to "0", and the parameter about the ending edge thereof is set to "1", other arbitrary parameters appearing on the straight line may be represented as numeral values below 1. In other words, when the number of characters for constituting the character string is 10, "1" is divided by "10" to obtain "0.1", so that these intermediate parameters "t" may be calculated as follows: t="0.0", "0.1", "0.2", --- , "0.8", "0.9" and "1.0".

As described above the coordinate values of the character frames capable of storing the respective characters are calculated by substituting the thus calculated parameters "t" for the character string configuration functions P(t) and Q(t) corresponding to the two straight lines. This character frame corresponds to a rectangle surrounded by the two straight lines in which two sectioning lines for sectioning the right-sided and left-sided characters are employed as the right and left edges. When the calculation is made of the coordinate values of this character frame, it is required not to establish spaces between the adjoining characters. Then, the respective characters for constituting the character string to be outputted are arranged in such a manner that these characters can be stored within the corresponding character frames.

As a result, such a character string which owns varieties of shapes, or which extends back a long way with better balance conditions, otherwise which wholly owns natural smoothing conditions can be simply produced at high speed.

Nevertheless, this type of character string outputting apparatus may be more or less improved in view of a proportional spacing font. That is, in this prior apparatus, such an initial condition is necessarily required that the sizes or dimensions of the respective characters for constituting the character string are made constant. For instance, since it is so designed as the initial condition that the coordinate series of the respective characters are such a coordinate system constructed of 100×100 along the horizontal and vertical directions, such a font of a character string font body sizes (widths of characters) are different from each other cannot be outputted with a condition of proportional spacing. That is, a proportional spacing font is not available in this prior outputting apparatus.

This requirement to output such a proportional spacing font will now be described with reference to a concrete example shown in FIG. 9. That is, FIG. 9 schematically represents an example of the generic structure about a proportional spacing font. This font is represented such that the coordinate series indicative of the contour of this character is recited in the coordinate system of 100×100 in the horizontal and vertical directions. Also, this font owns such a definition as the left side bearing "a" and the font body size "b". The left side bearing is given to the portion overlapped with the adjoining characters, whereas the font body size corresponds to the character width occupied by this character. In this example, the left side bearing "a" is defined as follows: a=100 meshes for a character "W", a=35 meshes for a character "I", and a=15 meshes for a character "L". Furthermore, the font body size "b" is defined as follows: b=80 meshes for the character "W", b=30 meshes for the character "I", and b=65 meshes for the character "L".

FIG. 10A schematically represents such a condition achieved before the character arrangement when the three characters of W, I, L are proportionally spaced, and FIG. 10B schematically indicate such a condition achieved after the character arrangement. First, the character of "W" is arranged. In this case, the positional pointer is updated by the font body size (b=80) of this character "W". Then, the subsequent character "I" is arranged at the position defined by subtracting the left side bearing (a=35) of this character "I" from this updated position. Next, the positional pointer is moved along the right direction by the font body size (b=30) of this character "I". The remaining character of "L" is arranged at the position defined by subtracting the left side bearing (a=15) of the character "L" from the present position (80+30=110). In this case, the total character width of this character string "W, I, L" becomes 175, so that this character string may be properly arranged without making unnecessary spaces.

As described above, in such a proportional spacing font, since the respective character widths are different from each other for the respective characters, if the parameters of the character string configuration functions would be calculated in the arithmetic series manner based upon the character quantity of the desirable character string even in the proportional spacing font, then the character string could not allocated into the character string configuration region with realizing such a proportional spacing condition. As a result, it is practically difficult to obtain such a character string in a better balance with having natural smoothing conditions.

Even when the parameters would be calculated by accumulating the font body sizes and then the font would be simply stored in the character frames calculated by substituting the resultant parameters for the character string configuration function, the font of the character string could not be correctly represented with keeping the proportional spacing condition. That is, the font body sizes would be compressed as shown in FIG. 11A.

SUMMARY OF THE INVENTION

An object of the present invention is to provide such a character string outputting method/apparatus capable of varying dimensions of characters for constituting a desirable character string for each of these characters by moving an origin of a font and by changing enlarging rates of these characters when the respective characters are allocated into an arbitrary designated character string configuration region.

Another object of the present invention is to provide such a character string outputting method/apparatus that while each of character frames is determined which is used when proportional spacing fonts for constituting a desirable character string are allocated into arbitrary designated character string configuration regions, these character frames are defined under such a condition that the desirable character string is proportionally spaced, whereby proportional spacing fonts of the desirable character string can be outputted.

To achieve the above-described objects, according to one aspect of the present invention, a character string outputting apparatus for arranging a character string within a designated region, comprises:

region designating means for designating a character string configuration region so as to arrange the character string within said character string configuration region;

numeral sequence calculating means for expressing said character string configuration region in the form of a character string configuration function and for producing a configuration position of each of characters in the form of a numeral sequence;

character frame producing means for substituting the numeral sequence calculated by said numeral sequence calculating means for the character string configuration function to produce a coordinate value of a character frame in which said character string is allocated into said character string configuration region;

coordinate transforming means for moving a coordinate value of an origin about a font of each character contained in the character string to a predetermined position, and for parallel-moving coordinate data for constituting the fonts of the respective characters in correspondence with moving amounts of the origins; and output means for arranging the respective fonts of the characters constituting said character string within said character frame produced by said character frame producing means, and for outputting said character string proportionally spaced within said character string configuration region.

In accordance with another aspect of the present invention, a character string outputting apparatus for arranging a character string of a proportional spacing font within a designated region, comprises:

region designating means for designating a character string configuration region used to arrange a desirable character string in the form of a character string configuration function;

font body size accumulating means for accumulating a font body size of a proportional spacing font in each of characters which constitute said desirable character string, thereby obtaining a total value of the font body sizes about the entire desirable character string;

parameter calculating means for calculating a parameter for each of said characters contained in said desirable character string based upon both of the total value of the font body sizes of the proportional spacing fonts calculated by said font body size acculating means, and the font body size of the proportional spacing font about each of said characters;

character frame producing means for substituting said parameter calculated by said parameter calculating means for a character string configuration function, thereby producing a coordinate value of a character frame in which said desirable character string is allocated within said configuration region;

coordinate transforming means for moving an origin of the proportional spacing font to a preselected position with a desirable font body size, whereby a coordinate series within the desirable font body size is coordinate-transformed based on said moved origin, and for making the font size coincident with the desirable font body size; and output means for arranging said proportional spacing fonts of said respective characters contained in said character chain based on the coordinate series within said font body size, which has been coordinate-transformed by said coordinate transforming means, and for outputting said desirable character string proportionally spaced within said character string configuration region.

Further, according to another aspect of the present invention, a method for arranging a character string within a preselected character frame area in different magnifications of each character, comprises the steps of:

designating a character string configuration region so as to arrange the character string within said character string configuration region;

expressing said character string configuration region in the form of a character string configuration function;

producing a configuration position of each of characters in the form of a numeral sequence;

substituting the calculated numeral sequence for the character string configuration function to produce a coordinate value of a character frame in which said character string is allocated into said character string configuration region;

moving a coordinate value of an origin about a font of each character contained in the character string to a predetermined position;

parallel-moving coordinate data for constituting the fonts of the respective characters in correspondence with moving amounts of the origins; and arranging the respective fonts of the characters constituting said character string within said produced character frame, thereby outputting said character string proportionally spaced within said character string configuration region.

Moreover, according to a further aspect of the present invention, a method for arranging a character string within a preselected character frame area in different font sizes, comprises the steps of:

designating a character string configuration region used to arrange a desirable character string in the form of a character string configuration function;

accumulating a font body size of a proportional spacing font in each of characters which constitutes said desirable character string, thereby obtaining a total value of the font body sizes about the entire desirable character string;

calculating a parameter for each of said characters contained in said desirable character string based upon both of the total value of the font body sizes of the proportional spacing fonts calculated by said font body size acculating means, and the font body size of the proportional spacing font about each of said characters;

substituting said calculated parameter for a character string configuration function, thereby producing a coordinate value of a character frame in which said desirable character string is allocated within said configuration region;

moving an origin of the proportional spacing font to a preselected position with a desirable font body size, whereby a coordinate series within the desirable font body size is coordinate-transformed based on said moved origin;

making the font size coincident with the desirable font body size; and arranging said proportional spacing fonts of said respective characters contained in said character chain based on the coordinate series within said font body size, which has been coordinate-transformed, thereby outputting said desirable character string proportionally spaced within said character string configuration region.

In accordance with the major feature of the present invention, when the respective characters for constituting the desirable character string are allocated into the arbitrary designated character string configuration regions, since the origins of the fonts are moved to their preselected positions to thereby changing the enlarging rates of the characters to be outputted, the dimensions or sizes of the respective characters can be changed. When this featured technique is applied to, for instance, the proportional spacing fonts, the following proportional spacing operation may be carried out. That is, an origin of one character for constituting a desirable character string is moved by a distance defined by a left side bearing of this character, whereby a font size of this character is used as a body size thereof, and this process operation is repeated for the remaining characters contained in this desirable character string. Then, a proper character frame capable of storing therein the proportionally spaced character is so determined that a suitable parameter is calculated based upon both a total value of character widths of the proportional spacing fonts and a character width of each proportional spacing font, and this proper character frame is defined by substituting this parameter for the character string configuration function. As a consequence, even when the proportional spacing font is used, the desirable character string can be allocated into the character string configuration regions with being proportionally spaced. As a result, the proportional spacing fonts of the character string could be outputted with better character balances and natural smoothing conditions.

BRIEF DESCRIPTION OF THE DRAWINGS

For a better understanding of the present invention, reference is made of the detailed description to be read in conjunction with the accompanying drawings, in which:

FIGS. 4A to 4C are schematic illustrations for explaining a basic operation in case that a parameter for a proportional spacing font is calculated to determine a character frame, and a character string to be outputted is allocated into this determined character frame;

DETAILED DESCRIPTION OF THE PREFERRED EMBODIMENTS

Overall Arrangement of Word Processor

Figure 1:
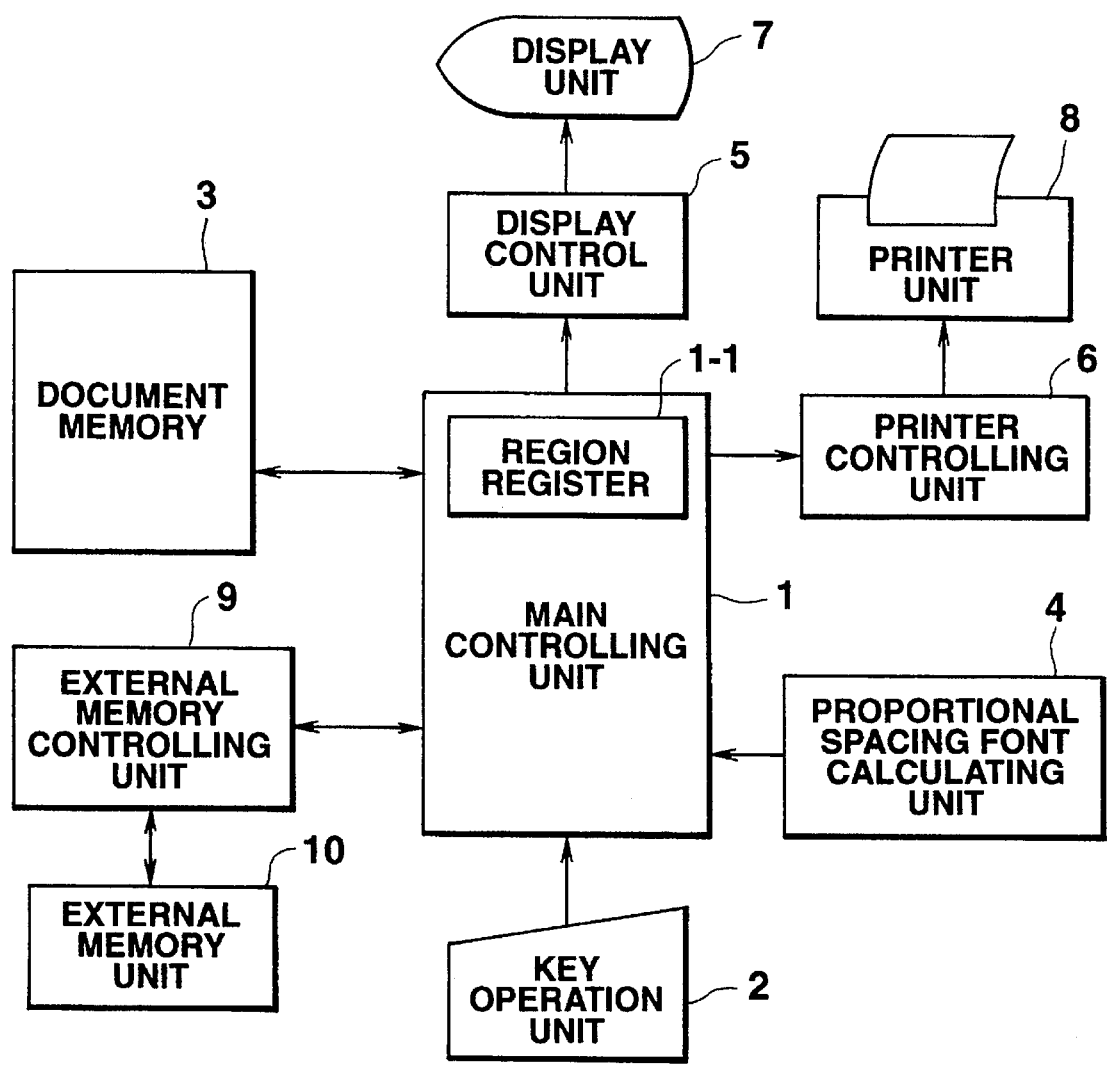
FIG. 1 is a schematic block diagram for representing an overall arrangement of a word processor to which the present invention is applied.

Referring now to FIGS. 1 to 7, a word processor to which the inventive concept has been applied will be described. FIG. 1 is a schematic block diagram for showing an overall arrangement of the word processor according to a preferred embodiment of the present invention. A major feature of this word processor is performed as follows: When a document written in English is outputted in the form of proportional spacing font, this English document, or text is printed out while performing the proportional spacing operation. Under such a circumstance, when a designation is made of a character string arranging region in which the character strings of the English text are arranged in predetermined areas, the proportional spacing font is arranged in the character string arranging region.

Referring back to the overall circuit arrangement of the word processor shown in FIG. 1, a main controlling unit 1 is employed to control overall operation of this word processor in accordance with various programs, for instance, to control input/output operations of peripheral devices such as a key operation unit 2, a display unit 7, a printer unit 8, and an external memory unit 10.

The key operation unit 2 is such a key input unit for inputting document data, various commands and so on. When the document data is entered by operating this key operation unit 2, the document data is processed by the main controlling unit 1 and the processed document data is stored into a document memory 3 in the code form. When the memory content of this document memory 3 is read out, the main controlling unit 1 initiates a proportional spacing font calculating unit 4. The function of this proportional spacing font calculating unit 4 is to convert the content of the document 3 into displaying/printing dot patterns. The displaying/printing dot patterns are supplied to a display control unit 5 and a printer control unit 6, thereby being outputted from the display unit 7/printer unit 8.

On the other hand, there is provided a region register 1-1 within the main controlling unit 1. The region register 1-1 owns such a function to store therein the character string arranging region. This character string arranging region is used to arrange a character string to be outputted. When an arbitrary character string arranging region is designated through the key operation unit 2, this arbitrary character string arranging region is stored into the region register 1-1 under control of the main controlling unit 1. In this embodiment, a character string arranging region is specified, or defined by way of such a region sandwiched by two lines. In this case, a straight line, a Bezier curve, and an arc have been previously stored as the sort of lines to define such an arranging region. The sort of lines is selectively designated and also arbitrary shape/dimension of the region sandwiched by the two lines are designated so as to define a desirable character string arranging region. As a result, numeral data indicative of this designated character string arranging region is stored into the above-described region register 1-1. It should be noted that as to each of these two lines, a point on this line is represented by a single parameter, a parameter of a starting edge of this line is "0", and a parameter of an end edge thereof is "1". Accordingly, parameters present between the starting edge and the end edge become various values below 1, i.e., numerals below a decimal point. The data stored in this region register 1-1 are read out in response to the output command.

Also, the main controlling unit 1 reads out the content of the document memory 3 in response to the storage instruction issued from the key operation unit 2, and then supplies the read content to an external memory controlling unit 9 so as to be stored into the external memory unit 10. Further, the main controlling unit 1 may read out an application program from the external memory unit 10 in order to carry out the required process operation in accordance with this application program.

Internal Arrangement of Proportional Spacing Font Calculating Unit

Figure 2:
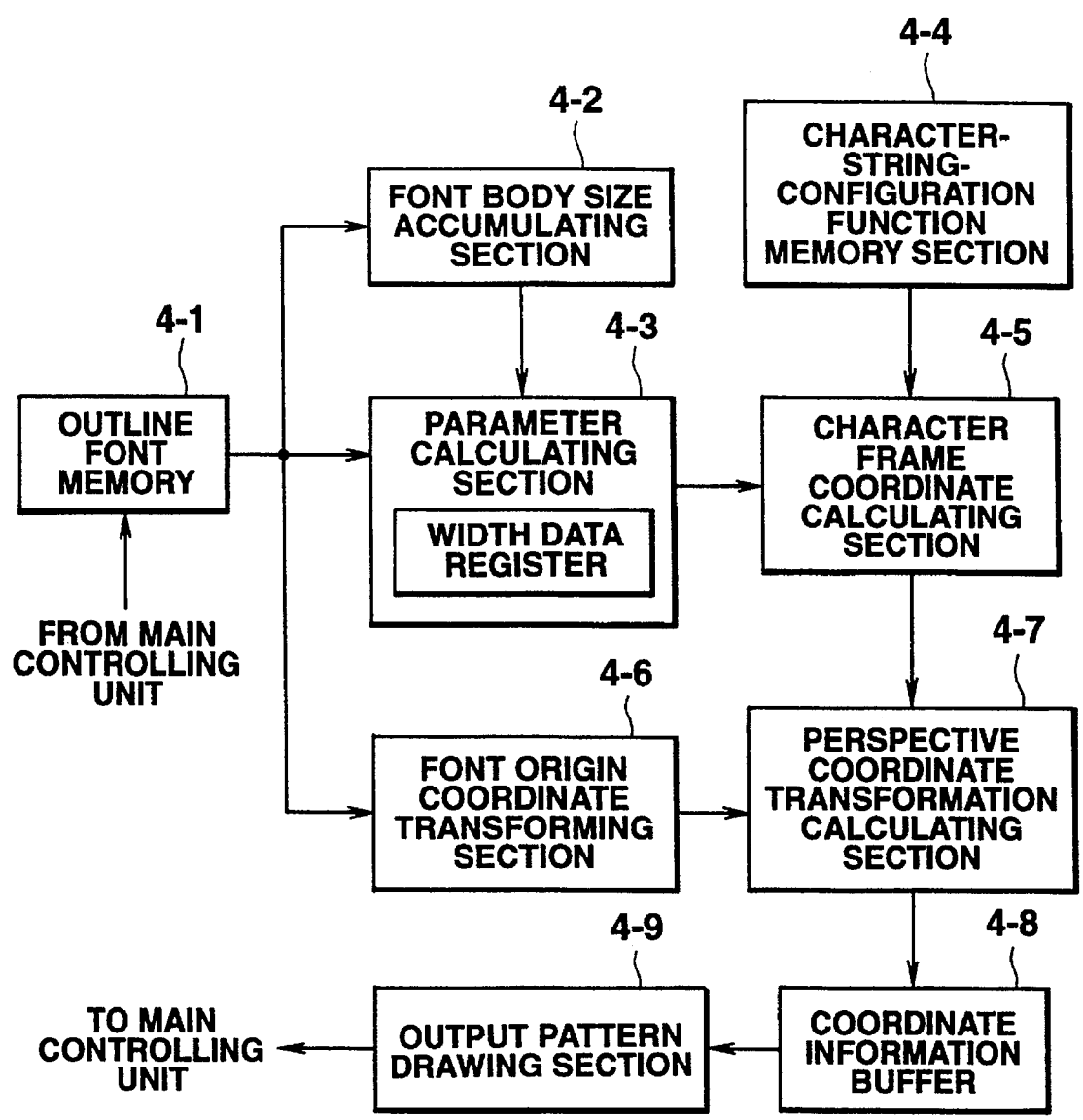
FIG. 2 schematically shows a block diagram of an internal circuit arrangement of the proportional spacing font calculating unit employed in the word processor of FIG. 1.

In FIG. 2, there is shown an internal arrangement of the above-described proportional spacing font calculating unit 4. The proportional spacing font calculating unit 4 is arranged by an outline font memory 4-1, a font body size accumulating section 4-2, a parameter calculating section 4-3, and a character-string-configuration function calculating section 4-4. This proportional spacing font calculating unit 4 further includes a character frame coordinate calculating section 4-5, a font origin coordinate transforming section 4-6, a perspective coordinate transformation calculating section 4-7, a coordinate information buffer 4-8, and an output pattern drawing section 4-9.

The outline font memory 4-1 stores outline fonts (involving a proportional spacing font) which are expressed by a coordinate series corresponding to various sorts of character. When a character string to be outputted is designated by operating the key operation unit 2, the outline fonts relevant to this character string are read out from the outline font memory 4-1 under control of the main controlling unit 1. The function of the font body size accumulating section 4-2 is given as follows: When the respective characters to constitute the character string to be outputted correspond to the proportional spacing fonts, the character widths (font body sizes) of the respective portional spacing fonts are successively accumulated to obtain a total value of the character widths with respect to the entire character string. The calculated character widths, or font body sizes are supplied to the parameter calculating section 4-3.

The parameter calculating section 4-3 calculates a parameter for each of the characters based upon both the total value derived from the font body size accumulating unit 4-2 and the character width of the respective proportional spacing fonts. The resultant parameters are supplied to the character frame coordinate calculating section 4-5. The character frame coordinate calculating section 4-5 produces such a character frame that the respective characters for constituting the character string to be outputted are allocated and positioned into the previously designated character string arranging regions. To this end, the character frame coordinate is calculated by substituting the parameter for the character string configuration function stored into the character-string-configuration function memory section 4-4.

The font origin coordinate converting section 4-6 converts the coordinate series within the below-mentioned font body size by parallel-transferring the origin of the proportional spacing font to an upper left position of a font body size about this origin. The necessity of such a coordinate transformation will be described more in detail. Thus, the transformed proportional spacing font is supplied to the perspective coordinate calculating section 4-7. Into this perspective coordinate calculating section 4-7, the coordinate series of the proportional spacing font is entered from the font origin coordinate transforming section 4-6, and furthermore, the character frame coordinate determined by the character frame coordinate calculating section 4-5 is entered. Then, the coordinate transformation of the coordinate series of the proportional font is carried out in the perspective coordinate transformation calculating section 4-7 by employing the known 2-vanishing point perspective method (detailed description thereof being omitted). That is, the perspective coordinate transformation calculating section 4-7 will coordinate-transform a proportional spacing font in order that this proportional spacing font may be stored within the relevant character frame. Thus, the transformed coordinate series is stored in the coordinate information buffer 4-8.

Finally, the output pattern drawing section 4-9 converts the character data into the output dot patterns (i.e., either displaying dot pattern, or printing dot pattern) one by one based upon the coordinate series stored in the coordinate information buffer 4-8. Then, the output dot patterns drawn by the output pattern drawing unit 4-9 are acquired into the main controlling unit 1, and thereafter are outputted from either the display unit 7, or the printer unit 8.

Proportional Spacing Font Calculating Operation

The proportional spacing font calculating operation by the above-described word processor will now be described with reference to FIG. 3 to FIG. 7.

As initial operations, to designate a desirable character string arranging region, a desirable line sort is designated from the straight line, Bezier curve, and arc and also a desirable shape/size of the region sandwiched by the designated two lines are designated by the key operation unit 2. Then, the numeral data indicative of this desirable character string arranging region is stored into the region register 1-1 under control of the main controlling unit 1. It is now assumed that a text written in an English language of the proportional spacing font is designated. Under such a circumstance, for instance, when a printing instruction is supplied from the key operation unit 2, the proportional spacing font calculating unit 4 is initiated by the main controlling unit 1. Then, the proportional spacing font calculating unit 4 performs the proportional spacing font calculating operation in accordance with such a flow operation as defined in a flow as defined in a flow chart of FIG. 3. The operation by this proportional spacing font calculating unit 4 will now be described in detail with reference to pictorial diagrams indicated in FIG. 4 to FIG. 7.

Figure 3:
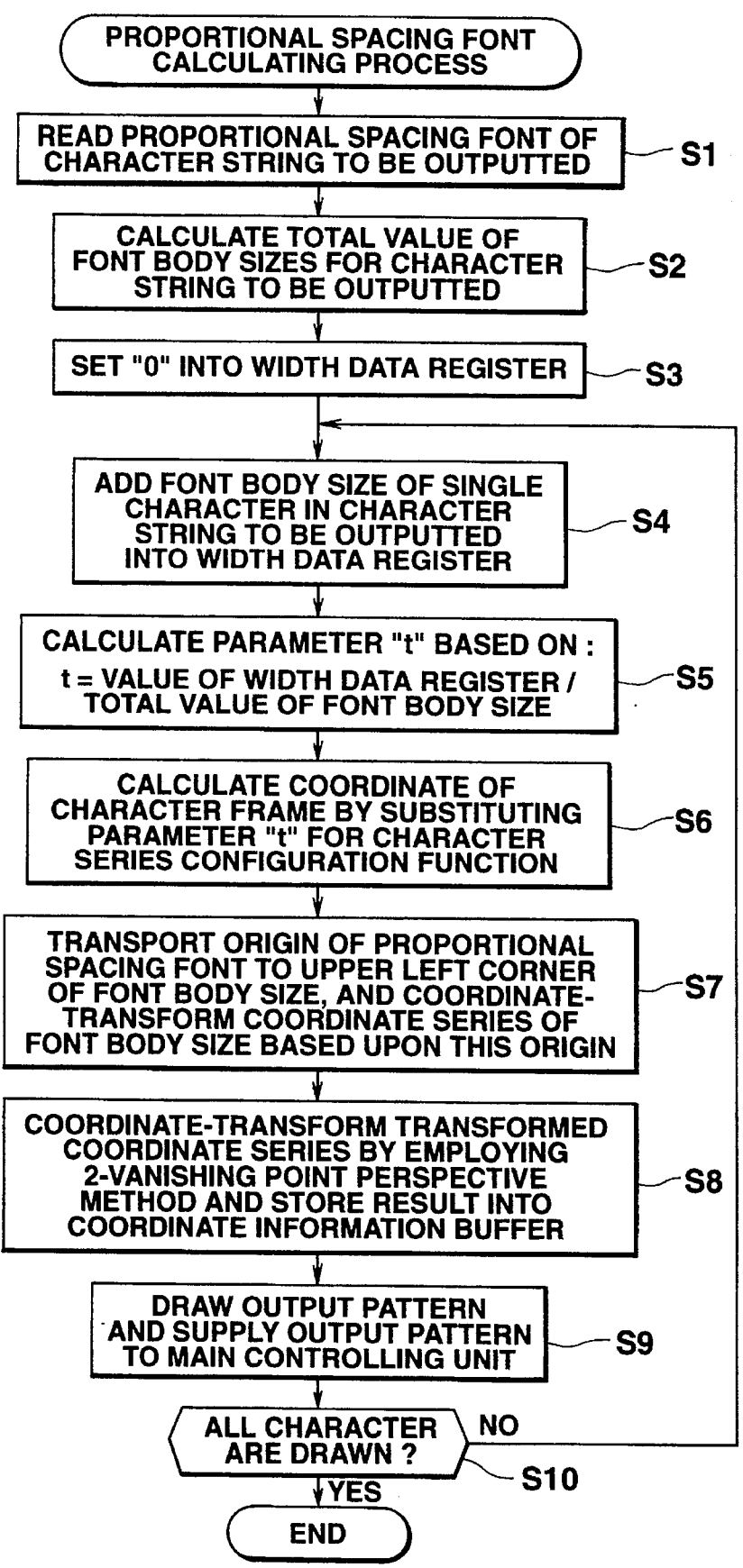
FIG. 3 is a flow chart for explaining operations of the proportional spacing font calculating unit shown in FIG. 2.
Figure 9A:
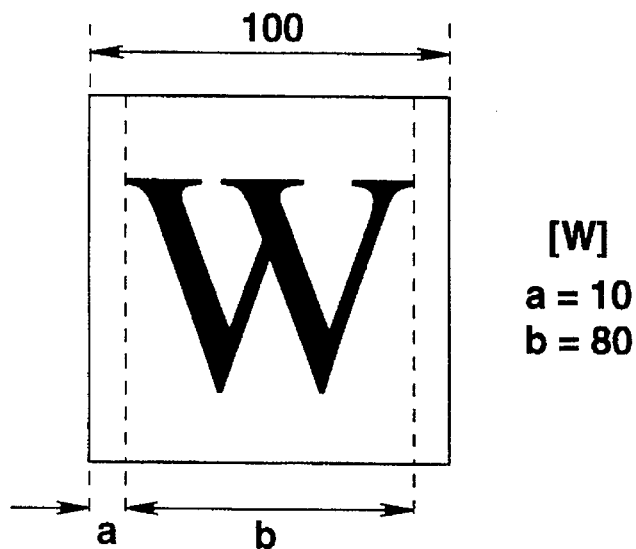
FIG. 9A to FIG. 9C are explanatory diagrams of the data structure of the normal proportional spacing font.
Figure 9B:
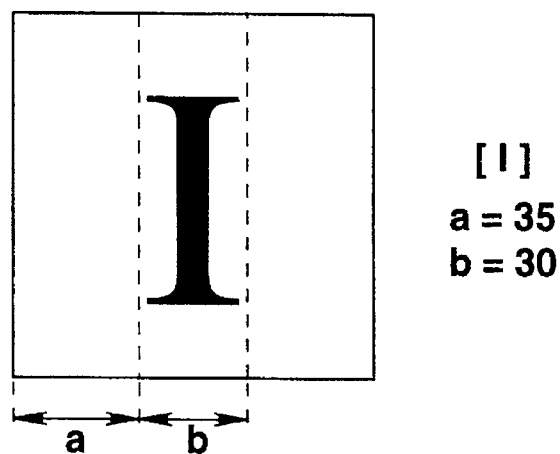
Figure 9C:
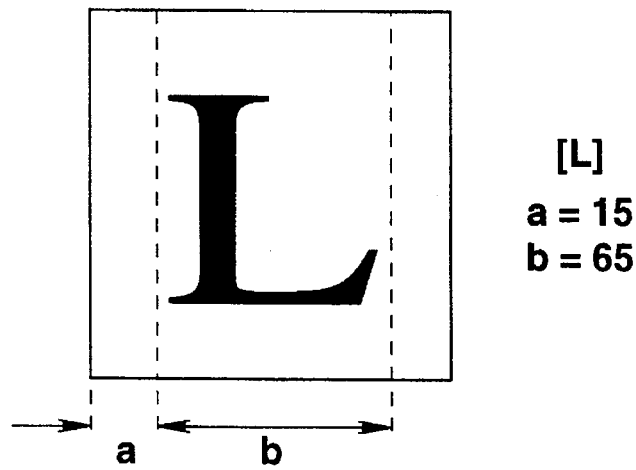
Figure 10A:
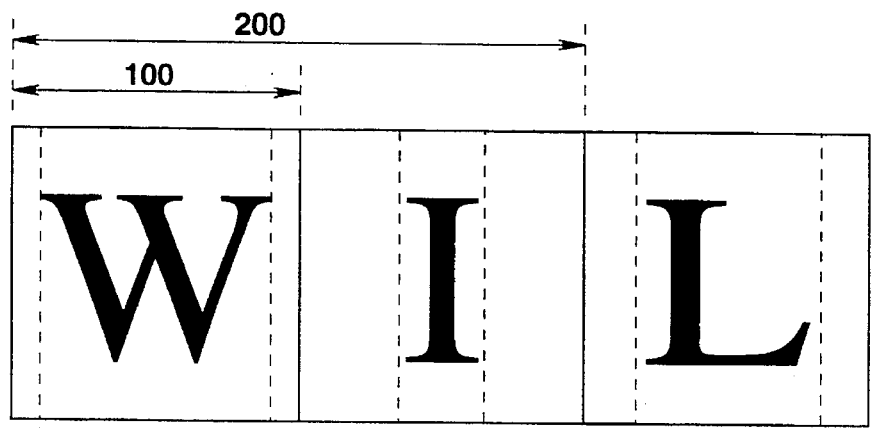
FIGS. 10A and 10B are explanatory diagrams about the normal proportional spacing.
Figure 10B:
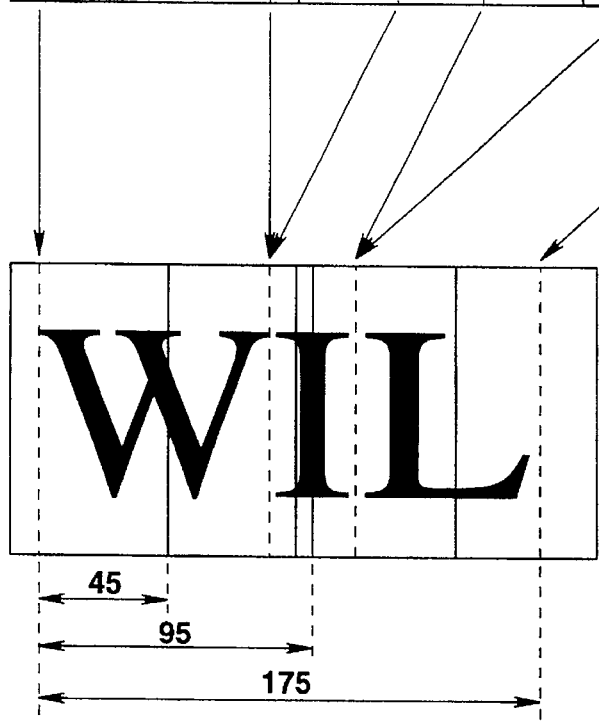

At a first step S1 of the flow chart shown in FIG. 3, the respective proportional spacing fonts to constitute the character string to be outputted are read out from the outline font memory 4-1. As a result, the font body size accumulating section 4-2 calculates a total value of character widths for the entire character string by accumulating the font body sizes of the respective proportional fonts (step S2). Assuming now that three characters of "W", "I", "L" are designated as the character string to be outputted, as illustrated in FIG. 4A, the total value of the character widths for this entire character string "W, I, L" becomes "175". This is because, as shown in FIG. 9, the body size (character width) of the first character "W" is "80"; the body size of the second character "I" is "30"; and the body size of the third character "L" is "65" (namely, 80+30+65). Next, a width data register functioning as a work register, employed in the parameter calculating section 4-3 (see FIG. 2) is cleared (step S3).

Under these circumstances, the parameter calculating section 4-3 sequentially detects the font body size of a single character from the head character among the character string to be outputted, which has been read out from the outline font memory 4-1, and then adds the detected font body sizes in the width data register (step S4). Subsequently, a parameter "t" is calculated by dividing the total value of the font body sizes (character widths) of the entire character chain by the added value of this width data register by means of the parameter calculating section 4-3. Next, the character frame coordinate calculating section 4-5 produces the character frame coordinate by substituting the parameter "t" calculated by the parameter calculating section 4-3 for the character string configuration function (step S6). It should be noted that the above-described process operation as defined at the step S4 to the step S6 will be repeatedly carried out for each of the characters within the character string to be outputted until all of the characters are detected at the below-mentioned step S10.

FIG. 4A schematically represents such a character string configuration condition when the proportional spacing operation is carried out for the desirable character string "WIL". The total value of the font body size for this entire character string is "175". A sectioning portion between the two characters "W" and "I" becomes "80", whereas a sectioning portion between the two characters "I" and "L" becomes "110". Then, these values of "80" and "110" are divided by the total value of "175", so that parameters for the respective sectioning portions may be obtained. That is, the parameter as to the left-side portion of this character "W" become t=0.0. Another parameter at the sectioning portion between the characters "W" and "I" is defined by:

$$t=80/175=0.45714.$$

Another parameter at the sectioning portion between the characters "I" and "L" is defined by:

$$t=110/175=0.62857.$$

A further parameter at the right side portion of the character "L" is defined by:

$$t=1.0.$$

As previously described, the resultant parameters are given as follows: t="0.0", "0.45714", "0.62857", and "1.0". The character frame coordinates may be determined by substituting these calculated parameters for the character string configuration function.

Here, the parameter "t" is substituted for character string configuration function "P(t)" and another character string configuration function "Q(t)", respectively. As illustrated in FIG. 4B, the first character string configuration function P8t) is defined by:

$$P(t)=(B-A) \times t+A,$$

which relates to such a straight line for connecting a coordinate position (100, 300) of a point "A" and also a coordinate point (500, 300) of a point "B", which specify the character string arranging region. Similarly, the second character string configuration function Q(t) is defined by:

$$Q(t)=(D-C) \times t+C,$$

which relates to such a straight line for connecting a coordinate position (100, 400) of a point "C" and a coordinate position (500, 400) of a point "D", which specify the above-explained character string configuration region. Now, paying an attention only to the X component in these functions, the X coordinate of the left edge of the character "I" is expressed by:

$$(500-100) \times 0.45714+100=283.$$

Then, the X coordinate of the left edge of the character "L" is expressed by:

$$(500-100) \times 0.62857+100=351.$$

Figure 5A:
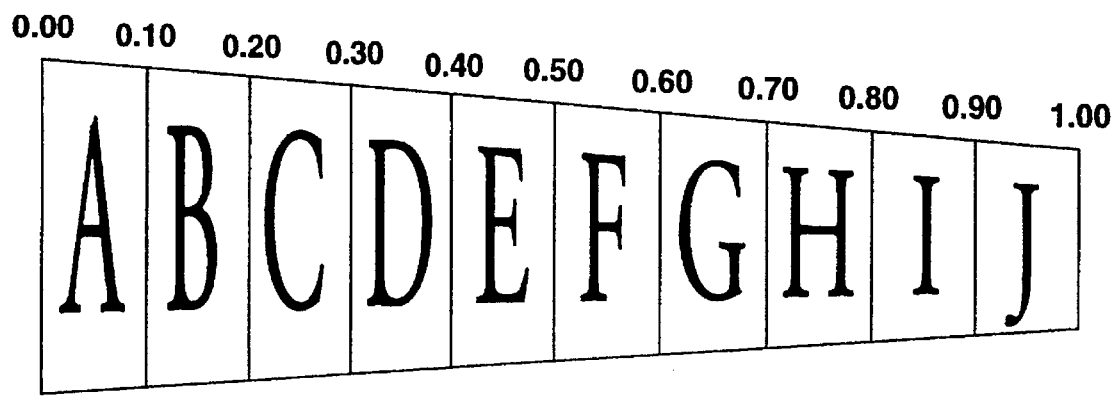
FIG. 5A schematically indicates a concrete example of such a case that a character string is allocated by employing the standard parameter.
Figure 5B:
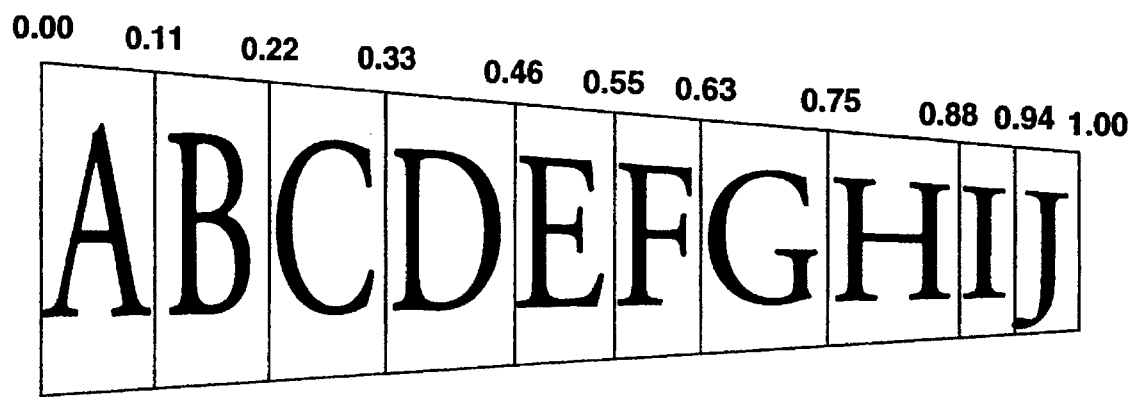
FIG. 5B schematically represents a concrete example of such a case that a character string is allocated by employing the parameter calculated in accordance with the embodiment.
Figure 8:
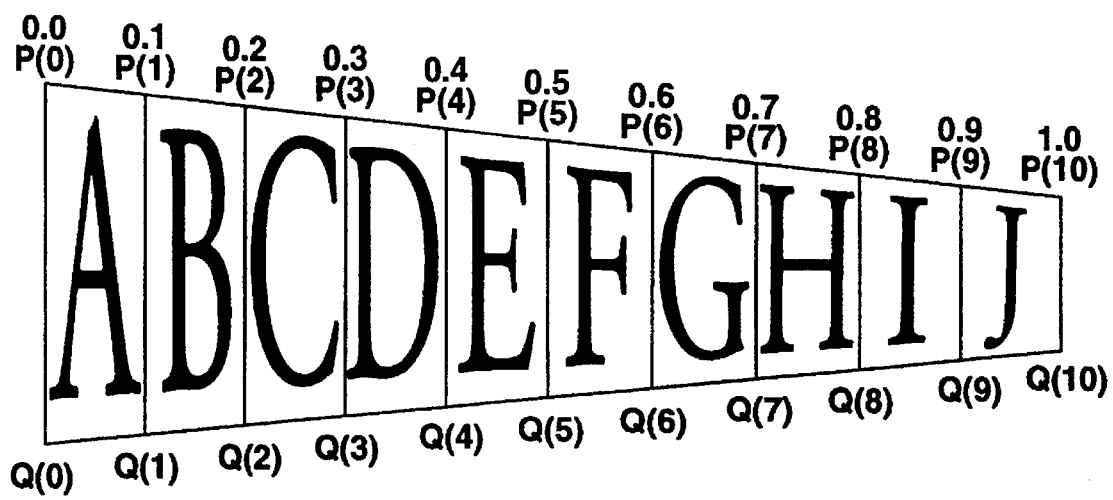
FIG. 8 schematically shows the standard technique for allocating a character string by employ the arithmetic series parameter.

As a consequence, it is possible to apply the technique as represented in FIG. 8 even to such a character string in which character widths of the respective characters are different from each other, like a proportional spacing font. That is, FIG. 5A schematically represents an example where a character chain is allocated by calculating the parameters in the form of arithmetic series based on the number of characters constituting the character chain, as shown in FIG. 8. FIG. 5B schematically represents another example in which the character chain is allocated by calculating the parameters in accordance with the inventive idea as described in this embodiment. It should be noted that with respect to such a proportional spacing font as a character chain "A B C D E F G H I J", the font body sizes thereof are defined as follows: A=82, B=85, C=91, --- , J=50. As a consequence, in the example of FIG. 5B, the character chain to be outputted is so allocated that the respective characters are proportionally spaced within the character chain arranging region.

Figure 11A:
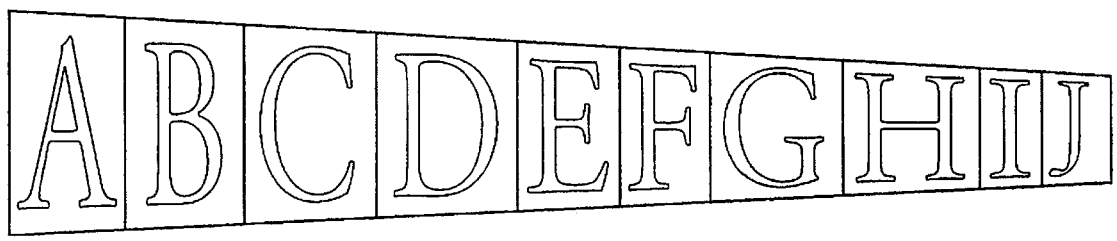
FIG. 11A schematically shows a concrete example of such a case that a character string is allocated without transporting an origin.

Referring back to FIG. 3 the process operation is advanced to a step S7 at which the font origin coordinate transforming section 4-6 transports the origin of the proportional spacing font in the parallel manner so as to transform the coordinate series of the proportional spacing font. In other words, generally speaking, an outline font is represented in the left side of FIG. 6A by such a coordinate series that an upper left corner of the font is assumed as an origin (0.0). When this outline font is processed by the coordinate transformation by employing the 2-vanishing point perspective method, the above-described coordinate series would be transformed into such a coordinate series as illustrated in the right side of FIG. 6A. However, in accordance with this embodiment, as to the proportional spacing font, the character frame is obtained in correspondence with the font body size. As a result, when such a coordinate transformation is carried out that all of the proportional spacing font may be stored within this entire character frame, as illustrated in FIG. 11A, the proportional spacing is not achieved. In other words, when the coordinate transformation would be carried out while maintaining the coordinate series such that he upper left corner of the proportional spacing font is used as the origin in order to store the entire proportional spacing font within the character frame, this coordinate transformation would be effected under such a condition that the portion which is originally overlapped with the adjoining character would be stored into this character frame, resulting in no proportional spacing. As a consequence, the characters would be arranged as if the font body size were compressed within the character frame.

Figure 11B:
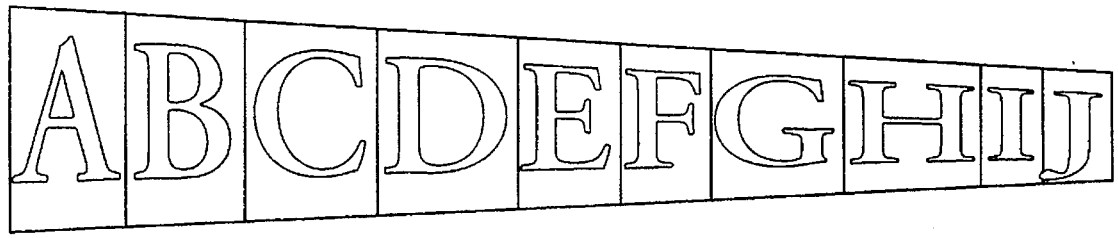
FIG. 11B schematically indicates a concrete example of such a case that a character chain is allocated after an origin of a font is transferred to achieve a font body size.
Figure 12:
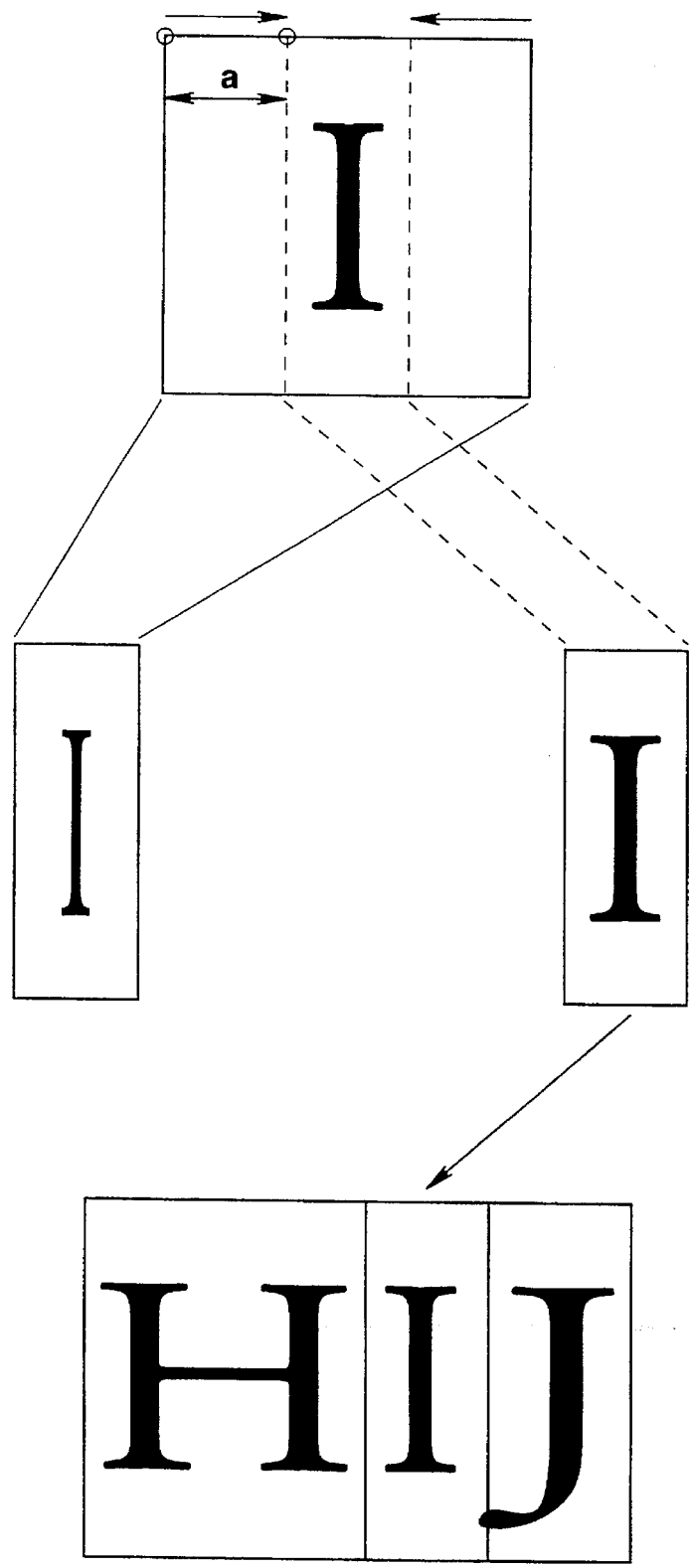
FIG. 12 schematically shows a difference in effects when the origin coordinate transformation is carried out for the proportional spacing font, and is not executed.

For a more better understanding of the above-explained feature of this preferred embodiment, another concrete example as to one character "I" will now be described with reference to FIG. 12. When the entire font is stored within such a region capable of storing the character "I", this character "I" would be compressed as illustrated in the left side of the middle stage of FIG. 12. Instead, this character "I" is parallel moved (namely, movement of origin) by the left side bearing "a" as shown in FIG. 9B, and thus the font size is made coincident with the body size, so that the entire character string can be correctly arranged under such a condition that the respective characters of this character string are processed in accordance with the proportional spacing manner, as illustrated in FIG. 11B, the right side at the middle stage of FIG. 12, and the lower stage of FIG. 12.

Figure 6A:
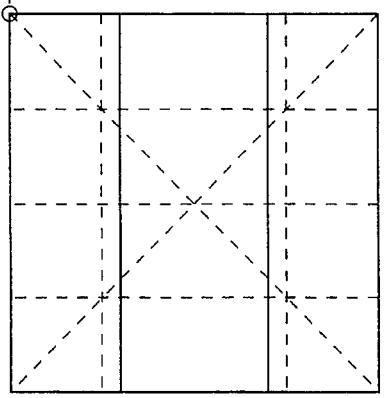
FIG. 6A and FIG. 6B schematically shows a basic operation of the font origin coordinate transforming unit employed in the proportional spacing font calculating unit of FIG. 2.
Figure 6A:
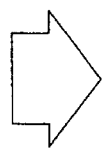
Figure 6A:
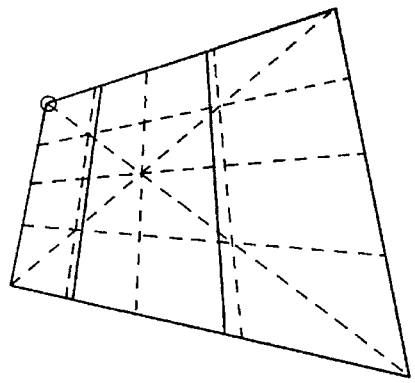
Figure 6B:
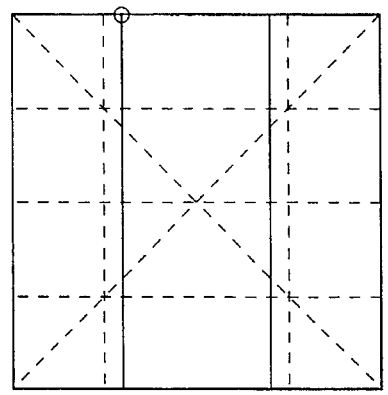
Figure 6B:
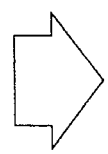
Figure 6B:
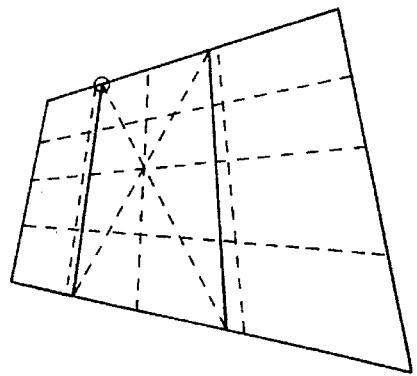

As described above, in this preferred embodiment, as illustrated in FIG. 6B, the origin of the proportional spacing font is parallel transported to the upper left corner of the font body size to establish a new origin, and thereafter, the coordinate series of the font body size is transformed based upon this new origin. In this case, the coordinate transformation is carried with respect to the character string located within such a rectangles shape (surrounded by a solid line of FIG. 6B) having a horizontal width equal to the width of the font body size.

Figure 7A:
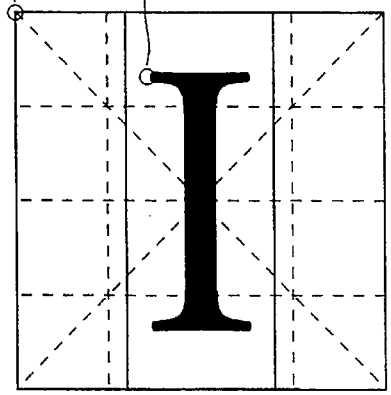
FIG. 7A and FIG. 7B schematically illustrate a concrete example of coordinate transformed by the font origin transforming unit of FIG. 2.
Figure 7B:
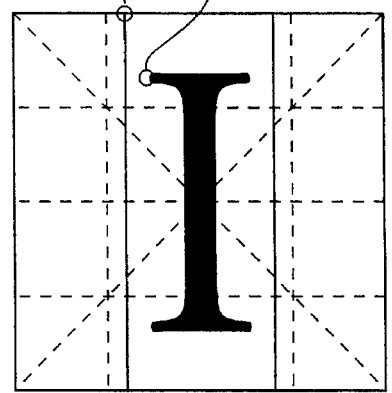

For instance, as illustrated in FIG. 7A and FIG. 7B, since the left side bearing of the character "I" is "a=35", the origin thereof is transported by this left side bearing "a". In this case, as the font body size of this character "I" is "b=30", when such an coordinate transformation is carried out for the character string present within such a rectangular form having a horizontal width equal to this body size (b=30), for instance, the upper left coordinate originally having the value of (38, 12) is transformed into another upper left coordinate newly having a value of (3, 12).

As previously described in detail, the origin is parallel moved and the font size is made coincident with the body size, whereby the coordinate series of the proportional spacing font becomes that of the font body size, and therefore the proportional spacing font may be conceptionally coincident with the character frame.

Subsequently, the process operation is advanced to a further step S8. At this step S8, the perspective coordinate transformation calculating section 4-7 transforms the coordinate series which has been transformed by the font origin coordinate transforming section 4-6 by utilizing the 2-vanishing point perspective method, and then stores the coordinate-transformed information buffer 4-8. As a result, the output pattern drawing section 4-9 draws the desirable dot pattern based upon the memory content (namely, coordinate-transformed series) of the coordinate information buffer 4-8, which will then be supplied to the main controlling unit 1 to the main controlling unit 1 at a step S9.

The above-defined proportional spacing operation is carried out with respect to all of the remaining characters contained in the desirable character series to be outputted. At a further step S10, if it is detected that such a proportional spacing operation has not yet been complete for all of the characters contained in the desirable character string, the process operation is returned to the step S4 at which the above-explained proportional spacing operation is repeatedly performed with respect to each of the remaining characters. As a result, the entire desirable character string can be outputted from the display unit 7 and/or the printer unit 8 under such a condition that the entire character string has been proportional-spaced to be completely stored within the character string arranging region.

As previously described in detail, in accordance with this embodiment, the respective character frames are determined, in which each of the proportional spacing fonts for constituting the desirable character string is allocated within the predetermined character string arranging region. Such character frames that the desirable character string is proportional-spaced and can be stored within the character arranging region are preferably determined to output the proportional spacing font. As a consequence, natural character connections may be realized in the resultant proportional spacing font, and therefore the resultant character series can be outputted with better balance. More specifically, such a specifically designed character string may be outputted even for a proportional spacing font by designating the character string arranging region by the Bezier curve, or the arc and/or by designating such a character string arranging region whose shape is unique.

It should be understood that although an arbitrary sort of line is selected from the straight line, arc, and Bezier curve to designate the character string arranging region in the above-described embodiment, the present invention is not limited only to these sorts of lines, but may be applied to other types of lines. Also, the shape of this character string arranging region may be varied.

Figure 13:
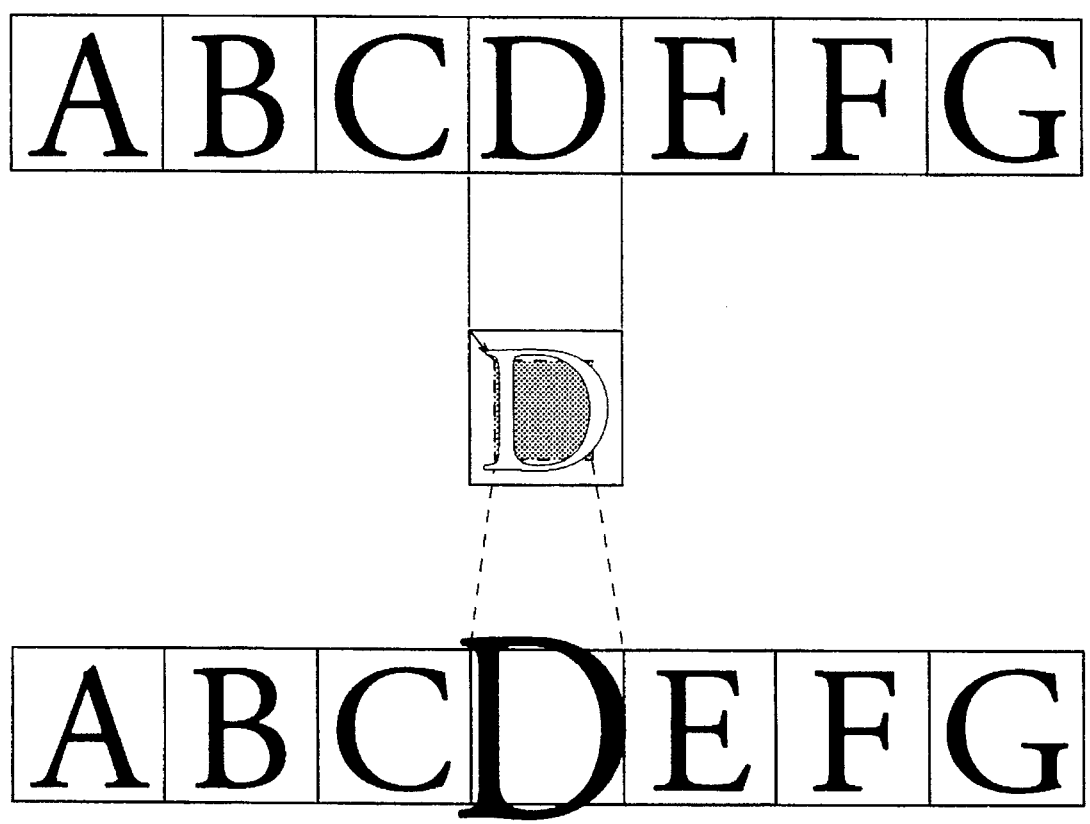
FIG. 13 schematically represents an effect achieved when a character string is arranged by way of the origin coordinate transformation.

Furthermore, although the above-explained embodiment described the English text, many other documents with other different proportional spacing fonts may be processed in accordance with the present invention. As illustrated in FIG. 13, the present invention may be practiced in such a case that a size of an arbitrary character is varied other than the arrangement of the proportional spacing font.

What is claimed is:

1. A character string outputting apparatus for arranging a character string within a designated region, comprising:

region designating means for designating a character string configuration region so as to arrange the character string within said character string configuration region;

numeral sequence calculating means for expressing said character string configuration region in the form of a character string configuration function and for producing a configuration position of each of characters in the form of a numeral sequence;

character frame producing means for substituting the numeral sequence calculated by said numeral sequence calculating means for the character string configuration function to produce a coordinate value of a character frame in which said character string is allocated into said character string configuration region;

coordinate transforming means for moving a coordinate value of an origin about a font of each character contained in the character string to a predetermined position, and for parallel-moving coordinate data for constituting the fonts of the respective characters in correspondence with moving amounts of the origins; and output means for arranging the respective fonts of the characters constituting said character string within said character frame produced by said character frame producing means, and for outputting said character string proportionally spaced within said character string configuration region.

2. A character string outputting apparatus as claimed in claim 1 wherein said region designating means designates such a region sandwiched by two lines as said character string configuration region.

3. A character string outputting apparatus as claimed in claim 2 wherein said two lines are expressed by such a function that a common parameter is employed as a variable.

4. A character string outputting apparatus as claimed in claim 1 wherein said numeral sequence calculating means produces said numeral sequence in the form of the arithmetic series.

5. A character string outputting apparatus for arranging a character string of a proportional spacing font within a designated region, comprising:

region designating means for designating a character string configuration region used to arrange a desirable character string in the form of a character string configuration function;

font body size accumulating means for accumulating a font body size of a proportional spacing font in each of characters which constitute said desirable character string, thereby obtaining a total value of the font body sizes about the entire desirable character string;

parameter calculating means for calculating a parameter for each of said characters contained in said desirable character string based upon both of the total value of the font body sizes of the proportional spacing fonts calculated by said font body size accumulating means, and the font body size of the proportional spacing font about each of said characters;

character frame producing means for substituting said parameter calculated by said parameter calculating means for a character string configuration function, thereby producing a coordinate value of a character frame in which said desirable character string is allocated within said configuration region;

coordinate transforming means for moving an origin of the proportional spacing font to a preselected position with a desirable font body size, whereby a coordinate series within the desirable font body size is coordinate-transformed based on said moved origin, and for making the font size coincident with the desirable font body size; and output means for arranging said proportional spacing fonts of said respective characters contained in said character chain based on the coordinate series within said font body size, which has been coordinate-transformed by said coordinate transforming means, and for outputting said desirable character string proportionally spaced within said character string configuration region.

6. A character string outputting apparatus as claimed in claim 5 wherein said region designating means designates such a region sandwiched by two lines as said character string configuration region.

7. A character string outputting apparatus as claimed in claim 6 wherein said two lines are expressed by such a function that a common parameter is employed as a variable.

8. A method for arranging a character string within a preselected character frame area in different magnifications of each character, comprising the steps of:

designating a character string configuration region so as to arrange the character string within said character string configuration region;

expressing said character string configuration region in the form of a character sting configuration function;

producing a configuration position of each of characters in the form of a numeral sequence;

substituting the calculated numeral sequence for the character string configuration function to produce a coordinate value of a character frame in which said character string is allocated into said character string configuration region;

moving a coordinate value of an origin about a font of each character contained in the character string to a predetermined position;

parallel-moving coordinate data for constituting the fonts of the respective characters in correspondence with moving amounts of the origins; and arranging the respective fonts of the characters constituting said character string within said produced character frame, thereby outputting said character string proportionally spaced within said character string configuration region.

9. A character string arranging method as claimed in claim 8 wherein said region designating step designates such a region sandwiched by two lines as said character string configuration region.

10. A character string arranging method as claimed in claim 9 wherein said two lines are expressed by such a function that a common parameter is employed as a variable.

11. A character string arranging method as claimed in claim 8 wherein said numeral sequence calculating step produces said numeral sequence in the form of the arithmetic series.

12. A method for arranging a character string within a preselected character frame area in different font sizes, comprising the step of:

designating a character string configuration region used to arrange a desirable character string in the form of a character string configuration function;

accumulating a font body size of a proportional spacing font in each of characters which constitute said desirable character string, thereby obtaining a total value of the font body sizes about the entire desirable character string;

calculating a parameter for each of said characters contained in said desirable character string based upon both of the total value of the font body sizes of the proportional spacing fonts calculated by said font body size accumulating means, and the font body size of the proportional spacing font about each of said characters;

substituting said calculated parameter for a character string configuration function, thereby producing a coordinate value of a character frame in which said desirable character string is allocated within said configuration region;

moving an origin of the proportional spacing font to a preselected position with a desirable font body size, whereby a coordinate series within the desirable font body size is coordinate-transformed based on said moved origin;

making the font size coincident with the desirable font body size; and arranging said proportional spacing fonts of said respective characters contained in said character chain based on the coordinate series within said font body size, which has been coordinate-transformed, thereby outputting said desirable character string proportionally spaced within said character string configuration region.

13. A character string arranging method as claimed in claim 12 wherein said region designating step designates such a region sandwiched by two lines as said character string configuration region.

14. A character string arranging method as claimed in claim 13 wherein said two lines are expressed by such a function that a common parameter is employed as a variable.

* * * * *

UNITED STATES PATENT AND TRADEMARK OFFICE
CERTIFICATE OF CORRECTION

PATENT NO. : 5,590,247
DATED : December 31, 1996
INVENTOR(S) : MIKUNI

It is certified that error appears in the above-indentified patent and that said Letters Patent is hereby corrected as shown below:

Column 15, line 38 (claim 12), change "step" to --steps--;

Column 16, line 9 (claim 12), change "by" to --in--;

line 10 (claim 12), change "accumulating means" to --accumulating step--.

Signed and Sealed this

First Day of July, 1997

Attest:

BRUCE LEHMAN

Attesting Officer

Commissioner of Patents and Trademarks